235-379
12/27/83 OR 4,423,318 SR

United States Patent [19]

Gotou

[11] 4,423,318

[45] Dec. 27, 1983

[54] TRANSACTION PROCESSING SYSTEM

[75] Inventor: Kanzen Gotou, Owariasahi, Japan

[73] Assignee: Hitachi, Ltd., Tokyo, Japan

[21] Appl. No.: 369,027

[22] Filed: Apr. 16, 1982

[30] Foreign Application Priority Data

Apr. 24, 1981 [JP] Japan .................................. 56-61217

[51] Int. Cl.[3] .............................................. G06F 15/30

[52] U.S. Cl. ..................................... 235/379; 235/382

[58] Field of Search ................ 235/319, 380, 381, 382

[56] References Cited

U.S. PATENT DOCUMENTS 4,314,352 2/1982 Fought ................................ 235/379

*Primary Examiner*—Harold I. Pitts

*Attorney, Agent, or Firm*—Antonelli, Terry & Wands

[57] ABSTRACT

A transaction processing system applicable to an automatic transaction machine such as an automatic cash dispenser or an automatic cash deposit machine which can automatically carry out transactions such as cash dispensing, balance check and depositing by an operation of an operator is disclosed. An initial operation direction is first displayed. If the initial operation in accordance with the other processing procedure is conducted by the operator, the processing is executed in the other processing procedure.

5 Claims, 4 Drawing Figures

TRANSACTION PROCESSING SYSTEM

BACKGROUND OF THE INVENTION

1. Field of the Invention

The present invention relates to a transaction processing system in an automatic transaction machine such as automatic cash dispenser or automatic cash deposit machine which allows an operator or customer to effect transaction such as cash withdrawal balance checking or cash deposit.

2. Description of the Prior Art

In the prior art of transaction processing system, a card precedence system in which the operator first inserts a magnetic card as an initial operation and a transaction button precedence system in which the operator first selects the type of transaction have been known.

FIG. 1 shows a flow chart of the transaction processing system in the prior art card precedence system. As an initial direction to the transaction operation, a direction to insert the magnetic card is displayed (step 1), and the magnetic card is inserted by the operator while the insertion of the magnetic card is checked (step 2). When the magnetic card is inserted, it is taken into the machine (step 3), read by the machine (step 4) and a direction to enter a secret number is displayed (step 5). When the secret number is entered (step 6), the entered secret number is compared with the secret number in the magnetic card data read by the machine (step 7), and if they are equal, a direction to select a type of transaction is displayed (step 8). When the operator depresses a transaction selection button (step 9, 10 or 11), the corresponding transaction processing is started (step 12, 13 or 14).

FIG. 2 shows a flow chart of the transaction processing in the prior art transaction precedence system. As an initial direction to the transaction operation, a direction to select a type of transaction is displayed (step 8), when the operator depresses a transaction selection button (step 9, 10 or 11), a direction to insert a magnetic card is displayed (step 1) and the magnetic card is inserted by the operator while the insertion of the magnetic card is checked (step 2). When the magnetic card is inserted, it is taken into the machine (step 3) and read by the machine (step 4). Then, a direction to enter a secret number is displayed (step 5). When the secret number is entered (step 6), the entered secret number is compared with the secret number in the magnetic card data read by the machine (step 7), and if they are equal, the transaction processing 12, 13 or 14 is started.

While three types of transaction are shown in FIGS. 1 and 2, the number of types of transaction may be any number no smaller than two.

The transaction processing system includes the card precedence system shown in FIG. 1 and the transaction precedence system shown in FIG. 2. When an operator who is experienced in using the card precedence system machine uses a transaction precedence system machine, he or she is frequently confused because of the difference in the initial transaction operation.

The operator who is experienced in using the card precedence system machine may try to insert the magnetic card without watching the display of the direction to select the type of transaction which is displayed as the initial operation direction in the transaction precedence system, but since only the transaction selection button is effective as the initial operation in the transaction precedence system, the magnetic card inserted by the operator and detected by a magnetic card sensor is not taken into the machine by a magnetic card drive roll and the transaction operation and the transaction processing do not proceed.

SUMMARY OF THE INVENTION

It is an object of the present invention to provide a transaction processing system which renders effective not only the initial operation as instructed by the initial operation direction but also the initial operation of either depression of the transaction selection button or the insertion of the magnetic card and proceeds the transaction operation to the next step of the initial operation direction.

In accordance with one feature of the present invention, each transaction can be processed in any one of a plurality of processing procedures, and if an initial operation relating to one processing procedure is conducted while another processing procedure is displayed, the processing is proceeded in accordance with the undisplayed processing procedure.

DESCRIPTION OF THE PREFERRED EMBODIMENT

Figure 1:
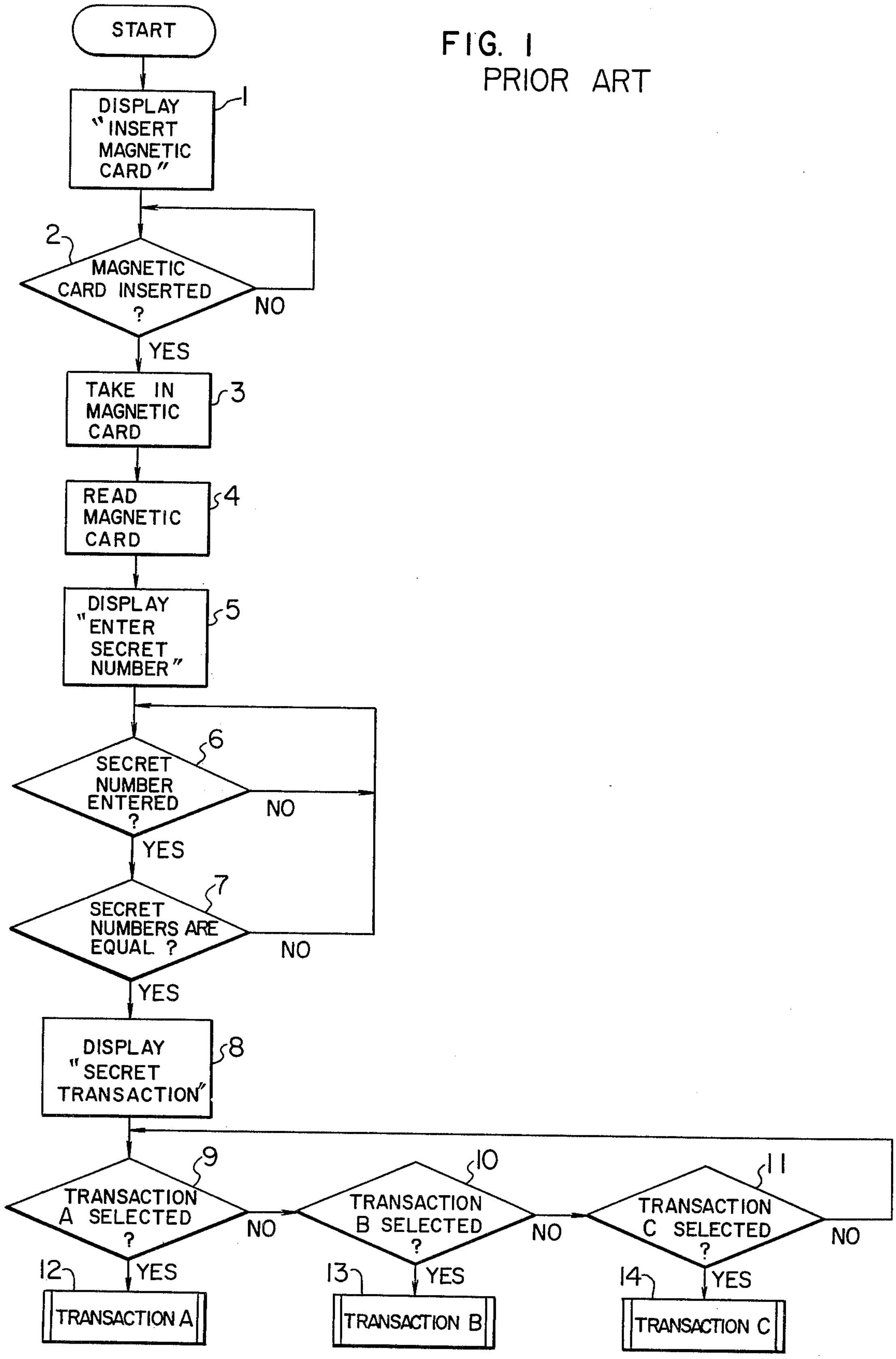
FIG. 1 PRIOR ART
FIG. 1 shows a flow chart of a transaction processing system in the prior art card precedence system.
Figure 2:
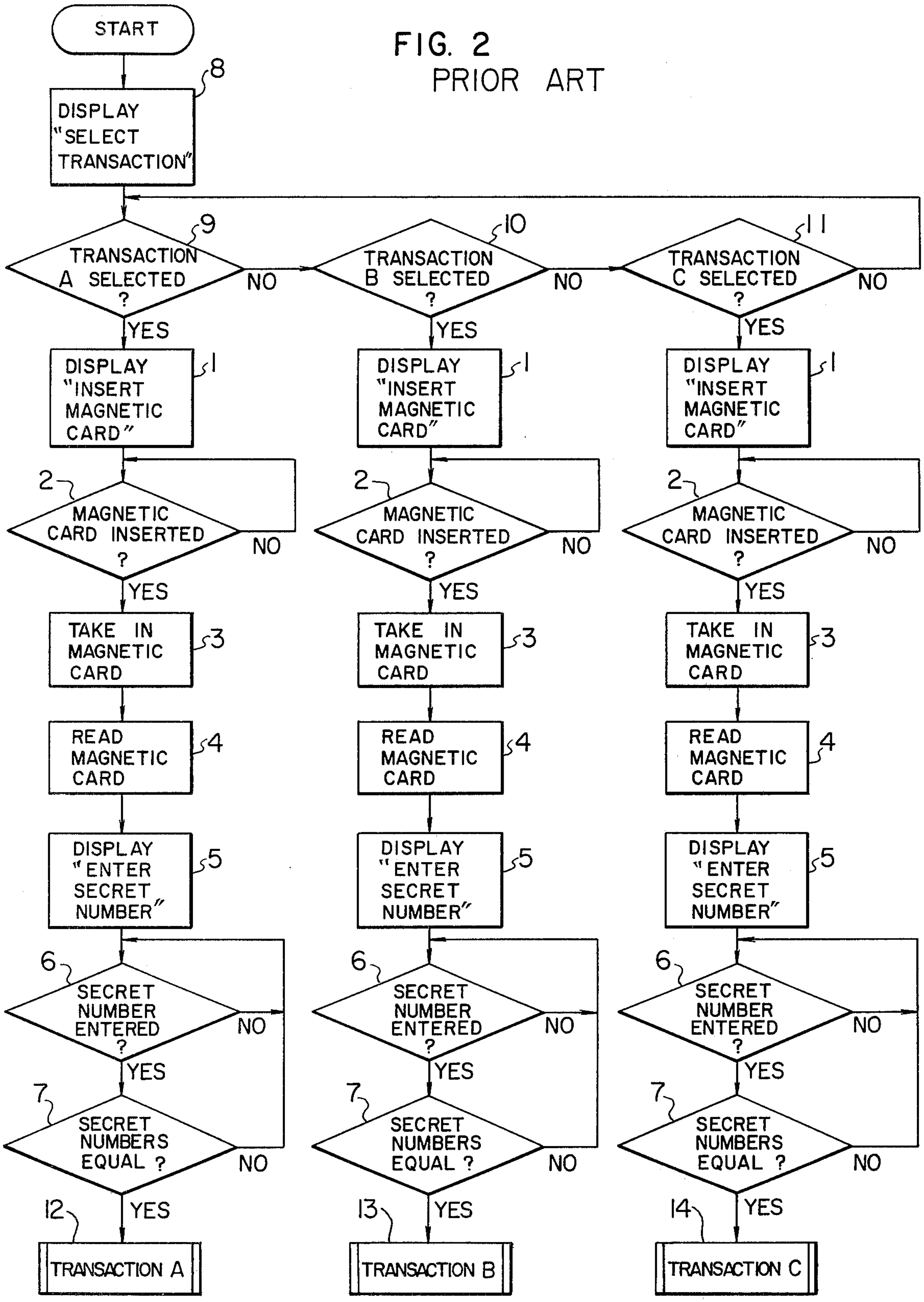
FIG. 2 PRIOR ART
FIG. 2 shows a flow chart of a transaction processing system in the prior art transaction precedence system.

In the preferred embodiment, reference numerals are used for clarifying the contents of the flow chart as following:

1 . . . display "magnetic card insertion direction;"
2 . . . "magnetic card inserted?;"
3 . . . take in magnetic card;
4 . . . read magnetic card;
5 . . . display "secret number entry direction;"
6 . . . "secret number entered?;"
7 . . . "secret numbers are equal?;"
8 . . . display "transaction selection direction;"
9 . . . "transaction selection key A depressed?;"
10 . . . "transaction selection key B depressed?;"
11 . . . "transaction selection key C depressed?;"
12 . . . transaction processing A;
13 . . . transaction processing B;
14 . . . transaction processing C;
15 . . . magnetic card read unit;
16 . . . operation direction display;
17 . . . input unit;
18 . . . control unit;
19 . . . magnetic card sensor;
20 . . . magnetic card driver;
21 . . . magnetic card read head;
22 . . . transaction selection keys;
23 . . . ten-keys;
31 to 36 . . . registers;
37 to 42 . . . AND gates;
43 . . . data bus;

44 . . . control execution unit;
45 . . . address bus;
46 . . . memory unit;
47 . . . address decoder;
48 to 53 . . . gate selection lines;
D . . . first input operations;
E . . . displays for prompting another kind of input operations;
F . . . preparation of a designated transaction;
G . . . execution of the designated transaction.

Figure 3:
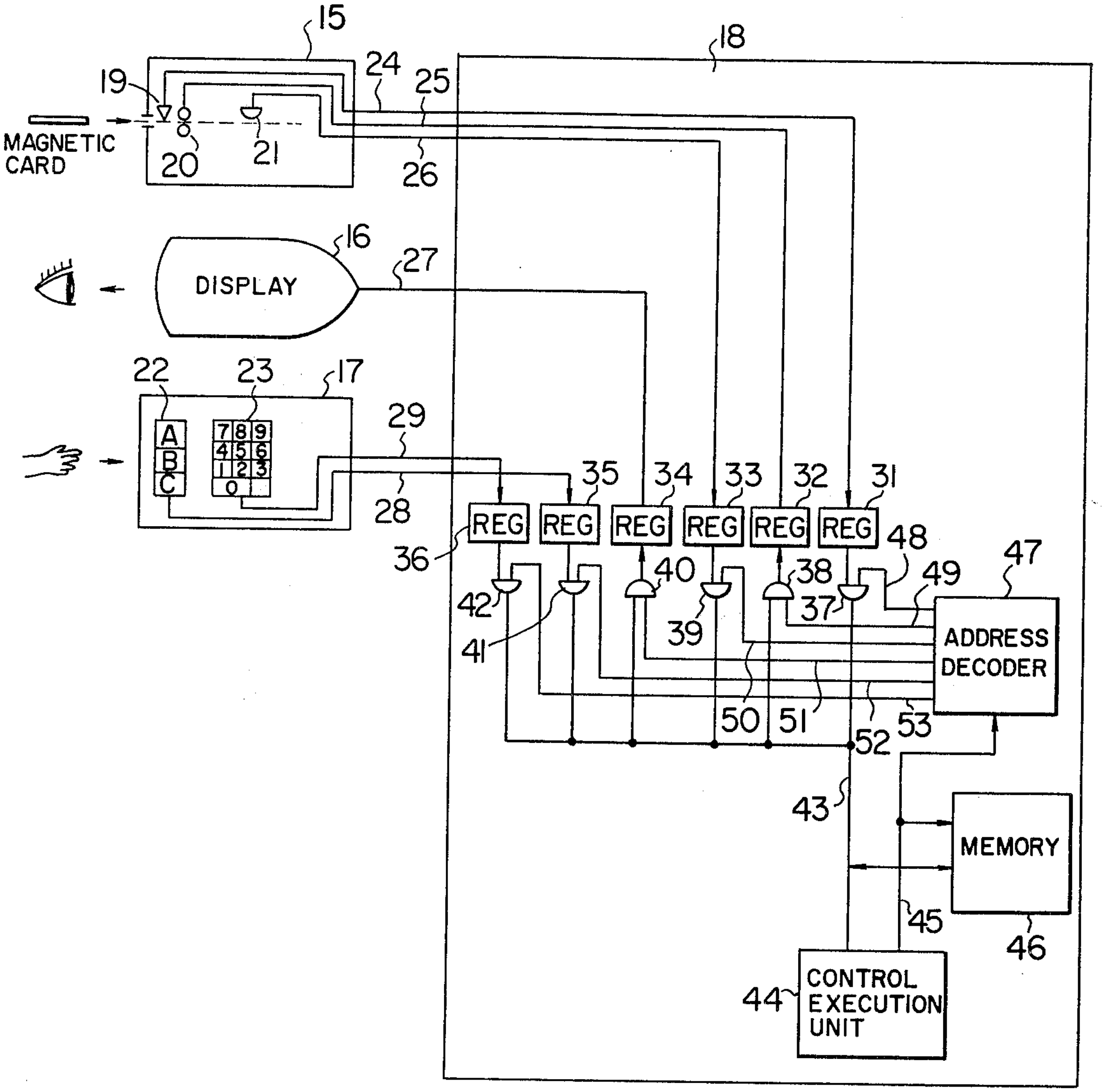
FIG. 3 shows a block diagram of a pertinent portion of an automatic transaction machine for explaining a transaction processing system in accordance with one embodiment of the present invention.

FIG. 3 shows a block diagram of a pertinent portion of an automatic transaction machine for explaining a transaction processing system in accordance with one embodiment of the present invention.

A magnetic card reader unit 15 detects the insertion of a magnetic card held by an operator, takes it into the unit and reads data on the magnetic card. It comprises a magnetic card sensor 19, a magnetic card driver 20 and a magnetic card read head 21, which are connected to a control unit 18 through signal lines 24, 25 and 26, respectively.

An operation direction display 16 displays directions for entry operations effected by the operator. It is connected to the control unit 18 through a signal line 27.

An input operation unit 17 is operated by the operator to enter data. It comprises transaction selection keys 22 and ten-keys 23, which are connected to the control unit 18 through signal lines 28 and 29, respectively.

While the transaction selection keys 22 are separate from the ten-keys 23 in the illustrated embodiment, the transaction selection keys 22 may be a portion of the ten-keys 23.

The control unit 18 controls an overall operation of the machine. The signal lines 24 to 29 are connected to registers 31 to 36, respectively, in the control unit 18. The registers 31 to 36 are connected to a control execution unit 44 through AND gates 37 to 42, respectively, and a common data bus 43. The operation of the control execution unit 44 is controlled by a program. It may be a microprocessor.

Numeral 45 denotes an address bus through which the control execution unit 44 sends address signals to a memory unit 46 and an address decoder 47. The memory unit 46 stores therein data necessary for the control execution unit 44 to operate. The memory unit 46 is accessed by the address signal sent from the address bus 45 and transfers the read and write data from or to the control execution unit 44 through the data bus 43. The address decoder 47 supplies a signal to one of gate selection lines 48 to 53 in accordance with the address data supplied from the address bus 45. The gate selection lines 48 to 53 are connected to the AND gates 37 to 42, respectively.

The output data from the magnetic card sensor 19 is loaded to the register 31 through the signal line 24, and when the signal is present on the gate selection line 48, the output data is supplied to the control execution unit 44 from the AND gate 37.

A control data for controlling the operation of the magnetic card driver 20 is supplied from the register 32 through the signal line 25. The control data in the register 32 is supplied from the control execution unit 44 through the AND gate 38 when the signal is present on the gate selection line 49.

The magnetic card read data from the magnetic card read head 21 is loaded to the register 33 through the signal line 26, and when the signal is present on the gate selection line 50, it is supplied to the control execution unit 44 through the AND gate 39.

A display data to be displayed on the operation direction display 16 is supplied from the register 34 through the signal line 27. The display data in the register 34 is supplied from the control execution unit 44 through the AND gate 40 when the signal is present on the gate selection line 51.

A transaction selection data from the transaction selection keys 22 which is produced by depressing the transaction selection key A, B or C is loaded to the register 35 through the signal line 28, and when the signal is present on the gate selection line 52, it is supplied to the control execution unit 44 through the AND gate 41.

Numerical data from the ten-keys 23 is loaded to the register 36 through the signal line 29, and when the signal is present on the gate selection line 53, it is supplied to the control execution unit through the AND gate 42.

The control unit 18 has a function to monitor the insertion of the magnetic card, the depression of the transaction selection keys 22 and the entry of data by the ten-keys 23. This function is attained by repeatedly supplying address corresponding to the registers 31, 35 and 36 from the control execution unit 44 to the address bus 45 at an appropriate time interval and reading the contents of the registers 31, 35 and 36 synchronously therewith and examining the contents.

Figure 4:
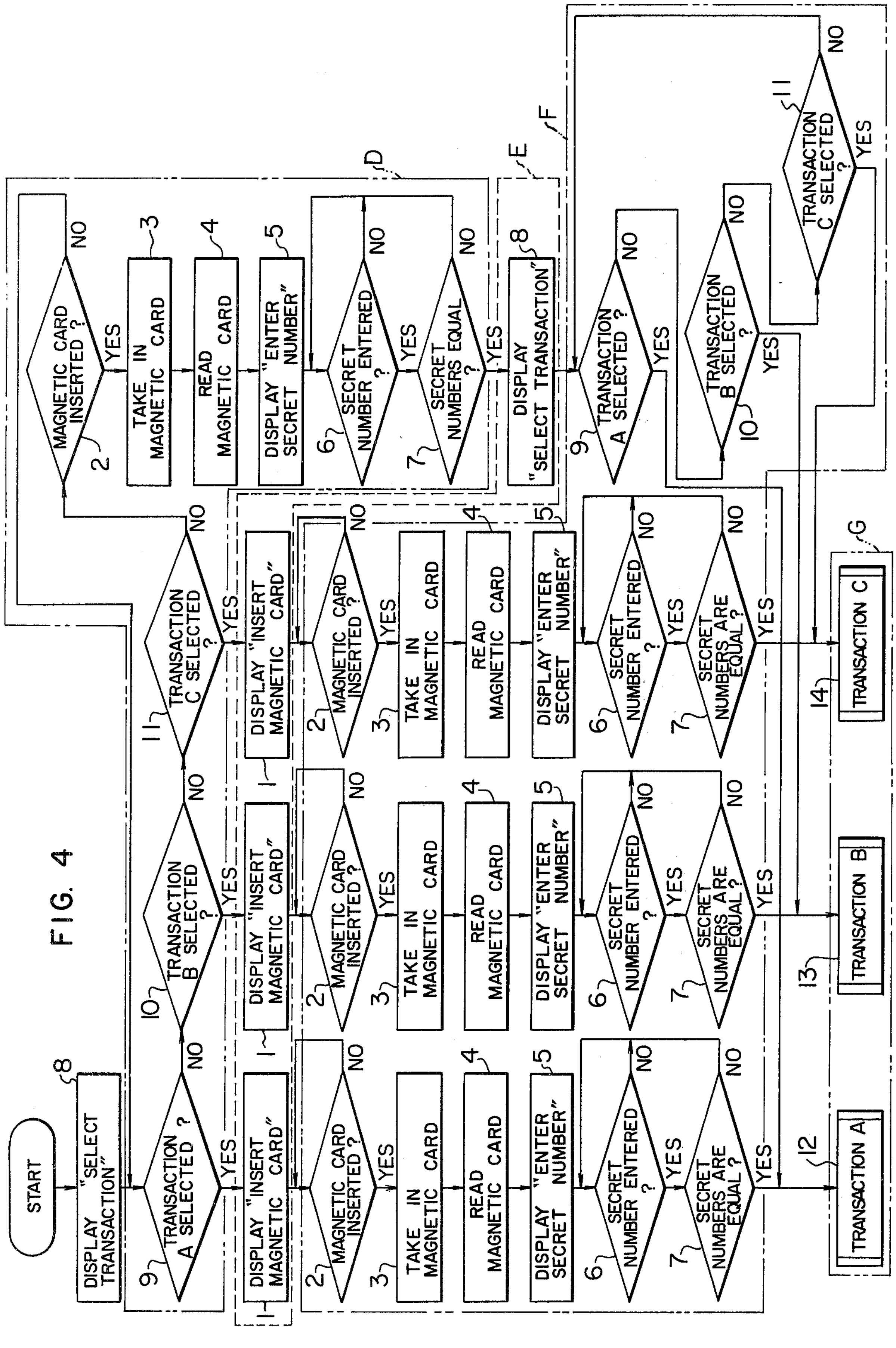
FIG. 4 shows a flow chart of the transaction processing system in accordance with one embodiment of the present invention.

FIG. 4 shows a flow chart of the operation of the automatic transaction machine shown in FIG. 3. The operation is now explained with reference to FIGS. 3 and 4.

The control unit 18 of the automatic transaction machine causes the operation direction display 16 to display the transaction selection direction as an initial transaction operation direction to an operator (step 8). The transaction selection direction instructs the operator to operate the transaction selection keys 22. The control unit 18 now monitors both the presence or absence of the entry of the transaction selection data from the transaction selection keys 22 and the detection of the insertion of the magnetic card by the magnetic card sensor 19. This simultaneous monitoring is attained by alternately supplying the address signals corresponding to the registers 31 and 35 from the control execution unit 44 to the address bus 45 at an appropriate time interval and reading the contents of the registers 31 and 35 synchronously therewith and examining the contents.

If the operator depresses the transaction selection key 22 as instructed by the transaction selection direction (step 9, 10 or 11 in block D), the transaction selection data is sent to the control unit 18. The control unit 18 discriminates the depression of the transaction selection key A, B or C (step 9, 10 or 11), and in each case the control unit 18 causes the operation direction display 16 to display the magnetic card insertion direction (step 1 in block E in FIG. 4) and monitors the detection of the insertion of the magnetic card by the magnetic card sensor 19.

When the operator inserts the magnetic card, it is detected by the magnetic card sensor 19 and the output signal thereof is sent to the control unit 18. Thus, the control unit 18 detects the insertion of the magnetic card (step 2 in block F in FIG. 4) and starts the magnetic card driver 20 to take in the magnetic card (step 3 in block F in FIG. 4). The magnetic card data is read by the magnetic card read head 21 (step 4 in block F). The control unit 18 reads in the read data and causes the operation direction display 16 to display the secret number entry direction (step 5 in block F), and monitors if the operator enters the secret number by the ten-keys 23. When the entered secret number data is sent to the control unit 18, the control unit 18 detects the entry of the secret number (step 6 in block F) and compares the entered secret number with the secret number of the magnetic card data stored therein (step 7 in block F). If they are equal, the control unit 18 transfers the control to the transaction processing (step 12, 13 or 14 in block G) corresponding to the depression of the transaction selection key A, B or C (step 9, 10 or 11 in block D in FIG. 4).

On the other hand, if the operator does not depress the transaction selection key 23 as instructed by the transaction selection direction but inserts the magnetic card when the operation direction display 16 displays the transaction selection direction as the initial transaction operation direction to the operator as shown by D in FIG. 4, the control unit 18 detects the insertion of the magnetic card by the magnetic card sensor 19 (step 2 in block D) and starts the magnetic card driver 20 to take in the magnetic card (step 3 in block D). The magnetic card is read by the magnetic card read head 21 (step 4 in block D), and the control unit 18 reads in the read data and causes the operation direction display 16 to display the secret number entry direction (step 5 in block D). It monitors if the operator enters the secret number by the ten-keys 23 of the input unit 17. When the entered data is sent to the control unit 18, it detects the entry of the secret number (step 6 in block D) and compares the entered secret number with the secret number of the magnetic card data stored therein (step 7 in block D). If they are equal, the control unit 18 causes the operation direction display 16 to display the transaction selection direction (step 8 in block E in FIG. 4) and monitors the depression of the transaction selection key 22. If the operator now depresses the transaction selection key 22, the transaction selection data is sent to the control unit 18 and the control unit 18 detects the depression of the transaction selection key A, B or C (step 9, 10 or 11 in block F in FIG. 4) and transfers the control to the transaction processing (step 12, 13 or 14 in block G in FIG. 4) corresponding to the depressed transaction selection key.

While three types of transaction are shown and described in the illustrated embodiment, the number of types of transaction may be any number no smaller than two. Instead of checking the equality of the secret numbers by the automatic transaction machine, the secret number entered by the operator may be sent to a central processing system where it is compared with the secret number stored therein.

The present system thus for described offers the following advantages.

Not only the depression of the transaction selection key but also the insertion of the magnetic card are permitted as the initial operation by the operator to the automatic transaction machine. When an operator who is experienced in the card precedence system inserts the magnetic card contrarily to the initial operation direction in the transaction precedence system, the processing procedure in the card precedence system is automatically carried out. Accordingly, the operator is permitted to use the automatic transaction machine of the transaction precedence system as the automatic transaction machine in the card precedence system. The processing procedure in the transaction precedence system is carried out in the same manner as the conventional system.

In the illustrated embodiment, the initial operation direction is displayed in the transaction precedence system. Alternatively, the initial operation direction may be displayed in the card precedence system and if the transaction selection key is depressed, the processing may be proceeded in accordance with the processing procedure in the transaction precedence system.

As described hereinabove, according to the present invention, even if the operator neglects the initial operation direction and operates another processing procedure, the operation is accepted and the processing is proceeded. Accordingly, the operability is greatly improved.

I claim:

1. A transaction processing system in an automatic transaction machine for automatically carrying out transactions including cash withdrawal, balance checking and depositing by an operation of an operator, comprising the steps of:

preparing a plurality of processing procedures for each transaction;

displaying an initial operation direction relating to one of the processing procedures for processing the transaction in accordance with said one processing procedure; and if an initial operation relating to other processing procedure than displayed is conducted, proceeding the processing in accordance with said other processing procedure.

2. A transaction processing system according to claim 1 wherein said one processing procedure is initiated when the operator first selects the type of transaction and said other processing procedure is initiated when the operator first inserts a magnetic card into a magnetic card receptacle.

3. A transaction processing system according to claim 1 wherein said one processing procedure is initiated when the operator first inserts a magnetic card into a magnetic card receptacle and said other processing procedure is initiated when the operator first selects the type of transaction.

4. A method of automatically carrying out by a machine a type of transaction initiated and designated by an operator adapted for banking business, the initiation and designation including two kinds of input operation by the operator, one for designating the kind of transaction and the other for enhancing identification of the operator by the use of a storage medium, comprising the steps of:

(a) displaying a message that the machine is ready for the input operation;

(b) sequentially detecting the presence and the kind of an input operation;

(c) displaying, after detection of an input operation, a message for prompting the other kind of operation than the detected input operation regardless of the kind of the displayed message, (d) preparing the machine for the designated transaction when the input operations have been properly performed; and (e) carrying out the designated transaction automatically by the machine.

5. A system of automatically carrying out a type of transaction initiated and designated by an operator adapted for banking business, the initiation and designation including two kinds of input operation by the operator, one for designating the kind of transaction and the other for enhanching identification of the operator by the use of a storage medium, comprising:

means for displaying a message that the system is ready for the input operation, means for sequentially detecting the presence and the kind of an input operation, said display means, after detection of an input operation, displaying a message for prompting the other kind of operation than the detected input operation regardless of the displayed message, means for preparing the system for the designated transaction when the input operations have been properly performed, and means for carrying out the designated transaction automatically by the system.

* * * * *